2 Sheets—Sheet 1.

J. H. BUTTERWORTH.

Combination Lock.

No. 1,193. Reissued June 4, 1861.

Witnesses.
R. G. Gunson
E. Clm Keeling

N. PETERS. Photo-Lithographer, Washington, D. C.

2 Sheets—Sheet 2.

J. H. BUTTERWORTH.

Combination Lock.

No. 1,193. Reissued June 4, 1861.

N. PETERS, Photo-Lithographer, Washington, D. C.

UNITED STATES PATENT OFFICE.

GEORGE D. BALDWIN, OF NEW YORK, N. Y., ASSIGNEE OF JOSHUA H. BUTTERWORTH.

IMPROVEMENT IN DOOR-LOCKS.

Specification forming part of Letters Patent No. 4,452, dated April 11, 1846; extended seven years; Reissue No. 1,193, dated June 4, 1861.

*To all whom it may concern:*

Be it known that JOSHUA H. BUTTERWORTH, of Dover, in the county of Morris and State of New Jersey, has invented an Improved Combination or Permutation Lock; and I do hereby declare that the following is a full and exact description thereof, reference being had to the accompanying drawings, and to the letters of reference marked thereon.

Figure 1:
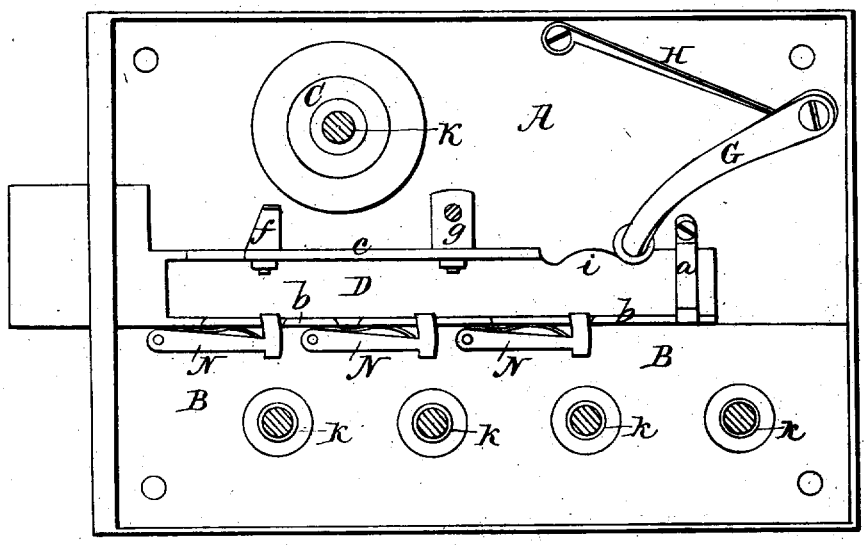
Figure 2:
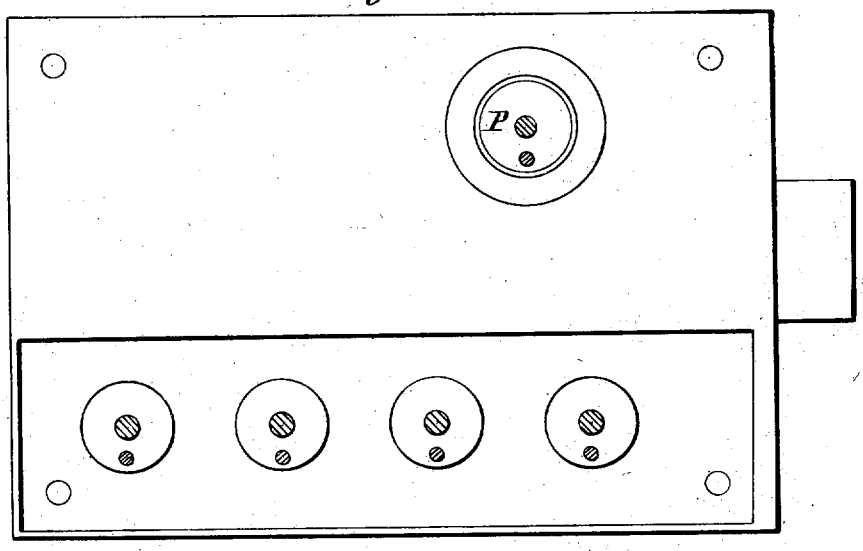
Figure 3:
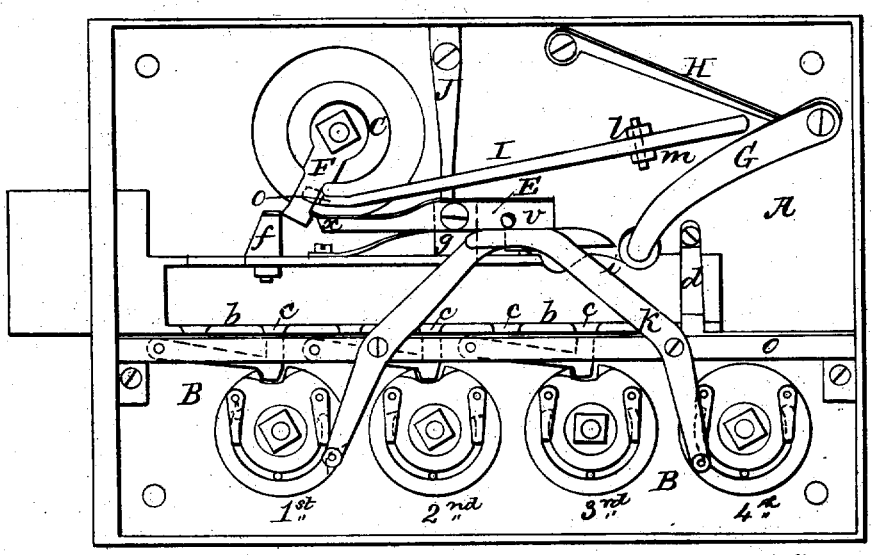
Figure 4:
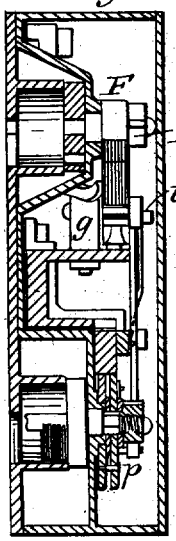
Figure 5:
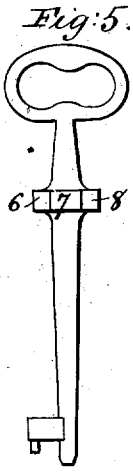
Figure 6:
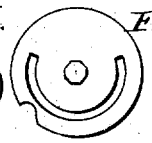
Figure 7:
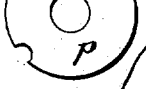
Figure 8:
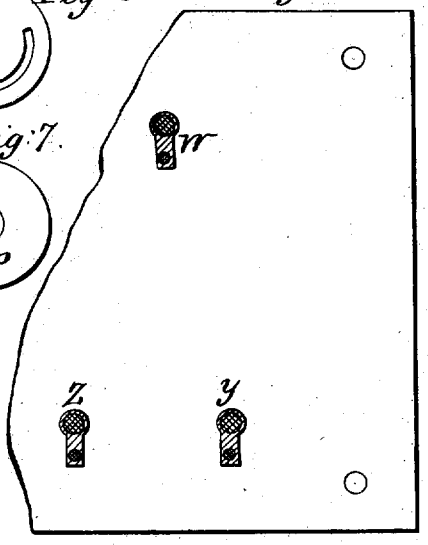

Figure 1 is a view of the case of the lock having the back plate and some of the works removed. Fig. 2 is a view of the front of the lock having the front or key-hole plate removed. Fig. 3 is the same view as Fig. 1, but with all the works shown. Fig. 4 is a section of the lock through two different planes, indicated by the red and blue lines on Fig. 3. Fig. 5 is a side view of the key. Fig. 6 is the upper or cam plate. Fig. 7 is the lower plate. Fig. 8 is a part of the front plate of the lock.

Similar letters represent the same parts in the different figures.

The object of my invention is to afford greater security to property confided to locks for safe-keeping than is usually obtained by locks in use hitherto. This object is obtained, first, by making a knowledge of the present existing combination of the lock necessary to enable any one to open it even with the key; second, by making it impossible to ascertain the existing combination of the lock by an examination of it from the front side when locked; third, by making the combinations changeable inside of the lock, so that a knowledge of how to open it at one time will not enable a person to open it after the combination is changed. Indeed, so little does the possession of the key enable any person, even one well acquainted with the construction of the lock, to do toward opening the lock that a stationary knob, having the necessary indices upon it, will answer every purpose.

This invention consists of the use of a series of locking-tumblers that enter into certain notches in the main bolt when shot forth, and are kept in their position by cam or disk plates that revolve upon centers having in their periphery a notch or space that when placed in a certain position, according to a set of prescribed motions, called a "combination," allow the tumblers to withdraw from the main bolt, so that it may be drawn back.

Second, it consists in making the talon by which the key acts upon the bolt in throwing it back movable, and so connecting it with cam or disk plates before mentioned as to withdraw it beyond the range of the key, and to keep it in that position until, by certain prescribed motions with the key, according to a combination which requires to be known to the operator, it is allowed to rise within range of the key so as to be acted upon by it.

Third, it consists of the use of a pawl, that acts against the key-bit, coming in contact with it a very small distance in advance of the movable talon, and prevents its motion in the direction of opening the lock or drawing back the bolt.

I make the case of my lock usually of cast-iron. It consists of a bed plate or plane for the bolt to slide on, A, an elevated plane for carrying the worm-work, B, a conical elevation for carrying the main key-bolt C, and the rim of the lock rising up from and surrounding the bed of the lock and inclosing its mechanism. (See Fig. 4.) This case is covered by a plain plate of metal that incloses the works. It is called the "back plate," and is screwed to the case of the lock by common machinery or lock-screws. The conical elevation C leaves a corresponding recess on the front side of the lock-case, which makes room for the main key-bolt and for the action of the main key. The edges of the elevated plane B and bed-plate A make an internal angle against which the bolt slides, and leave a recess on the front of the lock for the key-bolts and the action of the key in operating the lock. The rim on the front end of the lock through which the bolt passes is thicker than the rim around the other sides of the lock. (See Figs. 1 and 3.) I make that part of the bolt D that is shot out beyond the case of the usual form and strength to resist violence. Upward from the back of the bolt, along the edge of B, is raised the flange *b*, in which are the notches *c c c*, for the reception of the heads of the tumblers N, respectively. Upward from the other edge of the back of the bolt rises the flange *e*. Secured to *e* is the stud *f*, the face of which rises to the same height as *e*. To the same flange *e* is also secured the stud *g*, to which the movable talon E is confined by a screw-pin on which it moves. Under the front end of E is the spring *h*, by which it is pressed upward toward the position shown in Fig. 3. The bolt is confined to its proper position by the cap *a*, which is fastened to the bed-plate A by a screw, but so as to allow it to slide freely back and forth. The ordinary cam, *i*, is formed upon the edge of the back of the bolt, beyond the flange *e*, which is acted upon by the friction-roller J. The lever G, carrying the same, is pressed by the ordinary lock-spring, H, so as to insure the bolt its full range, shut or open.

Through the top of the truncated cone C, I make the round hole *k*, into which I pass the key-bolt P. This bolt has a flat head on the front side of the lock which lies flat upon the bottom of the recess formed by the cone C on the front side of the lock. The neck of P, being round, fits free into *k*. An octagonal section of the stem of the bolt rises above C, and fits into a corresponding octagonal hole in the key-bit F. Beyond F the bolt has a thread cut upon it and a nut fitted to it, which is screwed down upon F, which is thereby securely fastened to the bolt and turns with. In the center of the head of the bolt, on the front side of the lock, is a hole for the reception of the stem of the key, and a smaller one, near its edge, for the reception of a pin that projects downward from the bit of the key, Figs. 2 and 5. The form of the key-bit F will be seen in Fig. 3. Its point reaches in the direction of the bolt far enough to come in contact with the stud *f*, by which the bolt is shot forth, or locked, and only clears the top of it when the bolt has reached the extremity of its range.

The pawl I is secured to the bed of the lock by the clevis *l*, moving upon the pin *m*, and pressed upward by the spring J. It can descend low enough to allow the key-bit F to pass over it when turning in the direction of throwing out the bolt, but its range upward is confined to the position exhibited in Fig. 4. The shoulder *o* of the pawl reaches half-way up the side of the bit F, but the part shown by dotted lines under F cannot rise so high as to come in contact with the side of the key-bit F, which key-bit can always attain the position indicated in Fig. 3 by being turned in the direction that throws back the bolt.

The movable talon E is confined to the stud *g* by the screw shown in Fig. 3, on which it moves. The front end is lightened, being curved out on the side next the key-bit. It rises high enough to come within the range of the key-bit, which can just pass over it when the bolt has been fully withdrawn. There is a light spring under the front end of the talon that presses it upward toward the key-bit, and a stop-pin that projects down from the back end of the talon, that comes in contact with the flange *e* and defines its range upward.

A round pin, *v*, projects upward from the side of the talon, against which the two levers K K′ rest. These levers are connected with sets of disk-plates, by which they are made to elevate the back end of the movable talon, which depresses its front end entirely out of the range of the key-bit, which is in that condition entirely unavailing for the purpose of opening the lock.

The cam or disk plates (of which there are four sets in my present lock) consist of two plates to each set. The lower one has a round hole in its center that fits freely over the rim that rises around the holes *k* in B. A round pin, *p*, projects upward from its surface about three-sixteenths of an inch. The thickness of this plate is a little less than the height of the rim. The upper plate has an octagonal hole in its center that fits the octagonal part of the stem of key-bolt, (which is exactly similar to the one already described,) and can be placed with either side of the octagonal hole upon any one particular side of the stem. There is a circular slit, concentric with its circumference, that runs a little more than half-way round the plate, and of such width and distance from the center as to fit freely over the pin *p* in the lower plate. In the edge of the lower plates of the first, second, and third sets there is a notch cut of such width as to receive the foot of the tumblers N, and deep enough to let them descend sufficiently far to clear the bolt. There is a cam-like depression formed on the edge of the upper plates of the same sets of the same depth as the notches in the lower plates, but so curved as to force up the tumblers into the notches in the bolt when the plates are turned round. In the first set there is another notch and depression to receive the pin *u*, that projects downward from the lower extremity of the lever K′. Another notch and depression similar to the last described are made in the fourth set of disk-plates, which are shown in Figs. 6 and 7. This set is connected with and controls the position of the lever K. A key-bolt similar to that already described is placed in each of the four holes in B. The lower plate of each set is then dropped into its place over each rim, and a washer a little larger in diameter than the rim is placed on the octagonal part of each bolt and rests upon the rim. The upper plates are then placed upon the bolts with those sides of their octagonal centers upon such sides of the bolts as will produce the desired combinations. Another washer is then placed upon each bolt, and the nuts are screwed down upon them until each key-bolt revolves with sufficient freedom and firmness.

Three tumblers, N, each with a projecting head and foot, the head to enter the notch *c* in the bolt, and the foot to enter the notch in the back plate and the cam space or depression in the front plate, move upon their pins *r*, respectively. This pin is fixed into the plane B of the case of the lock, and passes through the carrier-bar O, Fig. 3, which is screwed to the bed of the lock so as to allow the tumblers to move freely under it. To this bar the levers K′ K are attached by screws, which are their fulcrums.

Operation: The lock is shown in Fig. 3 with the notches and cam-spaces in the lower and upper plates directly under the foot of the tumblers, and the tumblers, having descended into them, are withdrawn from the bolt, which is therefore under control of the key. The levers K′ K are also shown with the pins projecting downward from their lower ends in the notches prepared for them. The talon E has come within the range of the key-bit F, which is in just that position necessary to have shot out the bolt. If the key is introduced into the key-hole *w*, Fig. 8, and engaged with the key-bolt, it will immediately be found that the key cannot be turned in the direction of withdrawing the bolt, for the pawl I has risen up and its shoulder *o* checks the motion of the key-bit F in this direction. The key must now be turned in the direction of locking, when coming over the pawl, which will yield to its pressure. The key-bit comes in contact with the movable talon, which will also be forced down by it, until the angle of the octagonal index on the key, between the Figs. 1 and 8, is perpendicular over the center of the key-hole; then, the point of the key-bit having passed the point of the talon, the talon springs up. The motion being now reversed, the key-bit presses upon the end of the talon, and thereby the bolt is drawn back and the lock is open; but if care is not taken to stop and reverse the motion of the key before the key-bit has passed the shoulder *o* of the pawl, the operation will have to be repeated, for until the talon is up and the pawl down the bolt cannot be withdrawn. It is obvious that by placing the key-bit with different sides of its octagonal center upon the same side of the stem of the key-bolt all of the angles of the index on the key may be made to indicate the point at which the talon springs up.

The operation of locking is as follows: The key is introduced into the key-hole *w* and turned in the ordinary direction, by which the bolt is shot forth. The key is then applied to the first set of plates by the key-hole *y* and turned in any direction—say three quarters of a turn, or more if desired. By this means the upper plate, by means of its cam, forces up the tumbler connected with it into the notch of the bolt, and also forces the foot of the lever K out and the top of K against the pin *v*, which raises the back end of the talon and depresses the front end of it out of the range of the key-bit. The other three sets may be used or not, according as the owner of the lock thinks necessary for the protection of the property confided to its keeping.

To open the lock when in the condition just described, introduce the key into the key-hole *y*, engage the key-bolt and turn the key once round, and until the figures 1 2 have passed the perpendicular line over the center of the key-hole, and the angle between 2 and 3 comes upon the perpendicular line, which brings the notch in the lower plate under the foot of the tumbler. The motion is then to be reversed, and the 1 is to be brought perpendicular, when the tumbler will descend into the notch, and the talon rise within the range of the key-bit. The lock can be then unlocked, as already described. If the key be turned in the reverse direction, the index will be the angle between 7 and 8 for the back plate, and 1 for the front plate. It will be observed that the upper plates may, at the option of the owner, be placed in any of eight different positions upon their respective key-bolts. The angles between the figures 1 and 2, 2 and 3, 3 and 4, 4 and 5, 5 and 6, 6 and 7, 7 and 8, 8 and 1, on the key, may in their turns be made to indicate the position of the lower plate, when its notch is under the foot of the tumbler, thus affording an immense number of changes of combination in the lock, which makes it all but impossible for any person not in possession of a knowledge of the existing combination of the lock to open it, even when possessed of the key. To vary the changes still more, I sometimes make the circular slits in the upper plates of variable lengths, by covering a portion of each end with a movable slip of metal, 2, (see Fig. 3,) turning on a pin, so that the owner of the lock may at pleasure diversify by this means the adjustments and also the required positions and numbers of the key. It is obvious that when the upper plate is in any possible position relative to the lower one in which the lower is turned round by the motion of the key the notch in the lower is not opposite to the cam-space in the upper. The plates are both of the same diameter, and concentric with each other; therefore when the notch in the lower plate passes under the foot of the tumbler, the edge of the upper plate prevents any descent of the tumbler into it, or even any jar or other indication of the fact of the notch passing under it. In like manner the edge of the back plate supports the tumbler when the cam-space of the front plate is passing under it. Neither can any clue to the combination be obtained by pressure applied to the bolt, as such pressure is discharged upon the pin on which the tumbler moves. The foot of the tumbler does not press upon the plates in such case, the tendency of such pressure being to draw the tumbler toward the bolt.

It is necessary for the person using my lock to keep a record of the existing combination on a card or paper, as it would be very difficult to open the lock in case the combination was forgotten.

What I claim as my invention, and desire to secure by Letters Patent, is—

1. The pawl I described, or its equivalent, when combined with a movable talon that can yield to the pressure of the key-bit or key to a point beyond its range, in the manner and for the purpose set forth.

2. The use or employment of one or more sets of rotating cam or disk plates, such as are described, having two or more in a set, on the same stem, when so combined with a tumbler or tumblers that lock the main bolt, so that it cannot be withdrawn until all the plates are rotated into such a position relative to the tumbler that the resisting parts can enter the notches in the circular cam-plates, pass within the line of their periphery, and so allow the tumbler to withdraw from contact with and resistance to the withdrawal of the bolt.

3. The use or employmennt of cam or disk plates, two or more in a set having the same center or key-bolt, when so constructed that one plate only is attached to the key-bolt, the next plate being moved by the pin projecting from its surface coming in contact with the ends of the slits described, or in any analogous manner that allows the plate acted upon by the key to move during a part of its revolution without engaging and carrying round the next plate.

4. The use or employment of plates such as are described, two or more in a set, when so constructed and arranged as to require the motion of the key to be reversed in order to set each succeeding plate into such a position that the tumblers can descend into their notches and relieve the bolt.

5. The use of a plurality of cam or disk plates in one set, operated by one key, key-bolt, or stem, when so constructed that the plates are to be set consecutively by means of the same key, key-bolt, stem, or their equivalent, each plate to its own proper position, according to the existing combination, by the aid of the same index, so as to relieve the bolt from the tumbler, or other mechanism combined with the plates, that has kept the bolt from being drawn back.

6. The use or employment of disk or cam plates, such as are described, combined by levers or their equivalent with the talon that draws back the bolt, when so arranged that the talon is thereby withdrawn beyond the range of the key-bit and only allowed to come within its range so as to be acted upon by it when the plates have been brought into such a position as to allow that part of the levers that rests upon the edges of the plates to pass into the notches with the line of their periphery.

7. Separate pieces of metal 2 2 2 2, moving upon pins, when used in connection with cam-plates so as to change the point of contact between the plates themselves, and thus diversify regularly or irregularly the combination of permutation-locks.

GEO. D. BALDWIN,
*Assignee of Joshua H. Butterworth.*

Witnesses:
R. G. EMERSON,
EDWARD CHAS. KEATINGE.